United States Patent [19]

Allred et al.

[11] Patent Number: 5,104,908

[45] Date of Patent: Apr. 14, 1992

[54] METHOD OF SHAPING AND FELTING OPEN CELL POLYCHLOROPRENE LATEX FOAM

[75] Inventors: Donald R. Allred, Brookfield, Conn.; William S. Moller, Miamisburg, Ohio

[73] Assignee: Pitney Bowes Inc., Stamford, Conn.

[21] Appl. No.: 797,679

[22] Filed: Nov. 25, 1991

[51] Int. Cl.⁵ .................................................. C08J 9/36
[52] U.S. Cl. ..................................... 521/150; 521/918
[58] Field of Search ................................. 521/150, 918

[56] References Cited

U.S. PATENT DOCUMENTS 3,094,433  6/1963  Bugosh et al. .................... 521/150
4,943,598  7/1990  Ferro ................................. 521/918
4,943,599  7/1990  Ferro ................................. 521/918

Primary Examiner—Morton Foelak
Attorney, Agent, or Firm—Peter Vrahotes; Melvin J. Scolnick; David E. Pitchenik

[57] ABSTRACT

A method of felting partially cured open cell polychloroprene latex foam to obtain desired foam member properties with intricate geometric shapes. Such felting renders the finished foam suitable for controlled ink flow required for printing purposes. The foam is open cell latex polychloroprene, cured in a steam autoclave, washed and dried while in the partially cured state. Thereafter, the partially cured foam can be stored and formed into intricate shape and fully cured when required.

3 Claims, No Drawings

METHOD OF SHAPING AND FELTING OPEN CELL POLYCHLOROPRENE LATEX FOAM

COPENDING APPLICATIONS

Attention is directed to concurrently filed patent applications entitled Rechargeable Inking Pad and Method of Producing a Felted polychloroprene Foam, both by Betty R. Terry, and method of Felting Polychloroprene in Reduced Time by Donald R. Allred.

BACKGROUND OF THE INVENTION

In the printing industry, there are generally two types of inks, dispersion inks and solution inks. Dispersion inks have been widely used throughout the years because they more easily can be formulated. The primary disadvantage of dispersion inks is that their components tend to settle and, as a result, the inks must be agitated on occasion. Although solution inks do not have a settling problem, they are more difficult to produce. Recently, strides have been made in the capability of producing solution inks, but this has led to incompatibility with the systems that are used to apply such inks. For example, in the printhead of a postage meter, an inking pad or roller, hereafter collectively referred to as inking member, will contact the printhead to transfer ink thereto and be removed therefrom so that the inked print head can contact a mailpiece to print an indicia.

There are also two general types of inking members, rechargeable inking members and self containing inking members. In developing solution inks, it has been found that inking members that are acceptable for use with dispersion inks simply are not efficient when used with solution inks. This is because inking members suitable for dispersion inks have pores that are too large. Such large size pores are required to allow dispersed particles to be distributed through the inking member. Additionally, typical inking members for dispersion inks were found to be incompatible with polyglycols, a component of contemporary solution inks. Consequently, it has become evident that if the benefits offered by solution inks are to be realized, inking members must be developed that will enhance the use of such inks.

In this copending applications Rechargeable Inking Pad and Method of Producing a Felted Polychloroprene Foam, and method of Felting Polychloroprene in Reduced Time, methods are disclosed for producing a layer for an ink pad made of open cell felted polychloroprene foam. The felting of polychloroprene had been heretofore considered unattainable because of the resiliency and lack of compression set of polychloroprene. Although the method disclosed in the copending application proved satisfactory, it became evident such methods were lacking if felted foams with more intricate shapes were required.

SUMMARY OF THE INVENTION

Whereas the methods of felting open cell polychloroprene foams in the copending applications relate to the felting of commercially available polychloroprene foams which are fully cured. It has been found that intricate geometric shapes can be obtained only if non fully cured polychloroprene is used. During the fabrication of the open cell polychloroprene latex foam, it is removed from the final cure cycle prematurely and then compression molded (felted) into the intricate shapes. This premature removal allows the foam to be molded more easily and consistently into intricate shapes. The foam completes its cure as it is being felted during the compression mold cycle.

DETAILED DESCRIPTION OF THE PREFERRED EMBODIMENT

Many contemporary print mechanisms demand complex shapes and precise tolerances for the inker pad. Frequently, a printing system is designed with the ink pad configuration last. Currently the ink pad is multicomponent laminate using a compression molded open cell polychloroprene latex foam as the supply & distribution layer. The process of compression molding the polychloroprene foam is complex, requiring critical dwell times and mold size.

The instant method produces more reliability in terms of critical part dimensions in less processing time. This new method is designed to allow the final cure to be completed while the foam part is in the compression molding step. This allows more ease in implementing the production process. Specifically, the new method calls for curing the raw latex polychloroprene foam slab to 25-80% of full cure (based on cure time). The partially cured open cell polychloroprene foam is cured sufficiently to achieve and exhibit elastomeric foam properties. If the polychloroprene has less then approximately 25% cure. It will have the physical appearance of a gelled elastomer but no elastomeric properties, i.e., it will have no body and will collapse during the compression molding step and lose defined cell structure.

The material (25-80% cured) is then able to be stored in its partial cured state for a substantial period. The (partially cured) foam slab is eventually cut into predetermined sizes for compression molding. During this compression molding step, the shape is defined by the geometry of the mold in which it is heated. Cure of the polychloroprene is achieved due to residual catalyst, cross linking agents and applied heat. The cure is completed and the shape of the foam is maintained along with defined cell structure.

The open cell polychloroprene latex foam is obtained by first partially curing, i.e. curing to 25-80%. This partial curing is achieved by placing a raw composition of latex froth polychloroprene in a container and placing the container in an autoclave at a temperature of 420° F. to 520° F. at 80 p.s.i. for a period varying from 15-45 minutes for 25% to 80% cure. The partially cured polychloroprene foam is removed from the autoclave, washed, and dried by wringing through a wringer of the type one's grandmother used to have with her washing machine. Thereafter, the partially cured open cell polychloroprene latex foam will proceed as discussed above.

Felting of a fully cured polychloroprene foam is more difficult. During the felt step the polymer must be made to conform under heat and strain. The larger the crosslink density, the more difficult this is to accomplish. On occasion, some fully cured foams must chemically degrade before felting can be completed. However, a partially cured foam has the same physical structure as its cured counterpart, yet has a lower crosslink density. This factor enables the polymer chains to slide and ultimately crosslink at the final compressed state. The resultant material is now less susceptible to chemical swell forces due to its lower stress and higher state of cure.

Typically, industrial processes for fabricating latex foamed polychloroprene have several variables which directly effect the finished foams ability be felted. These variables include prepolymer content, environmental variations, set time prior to cure, age of the latex blend, and actual cure time. These variables are managed by forcing the latex foam to a full cure. However, felting is difficult and inconsistent due to the previously discussed crosslike density. By interrupting the cure cycle at about 25 to 80% of full cure time, one is able to felt the foam and finish the cure in the same step.

What is claimed is:

1. A method of producing shaped, felted polychloroprene foam, the steps comprising:
   a) placing uncured polychloroprene foam in a container,
   b) partially curing the polychloroprene foam to 25% to 80% cure by exposing to steam and pressure,
   c) placing the partially cured polychloroprene foam in a shaped mold,
   d) reducing the volume of the partially cured polychloroprene foam, and
   e) curing and felting the polychloroprene foam by heating the volume reduced, partially cured polychloroprene foam to 400° to 460° F. for a period of five to ten minutes.

2. The method of claim 1 wherein said partially curing step includes heating the polychloroprene foam 420° F. to 520° F.

3. The method of claim 2 wherein said partially cured polychloroprene foam is washed with water and dried.

* * * * *